(12) United States Patent
McIntyre

(10) Patent No.: US 8,188,162 B2
(45) Date of Patent: May 29, 2012

(54) PROCESS FOR PREPARING AN ENCAPSULATED PARTICULATE SOLID

(75) Inventor: Charles Rupert McIntyre, Stirlingshire (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 284 days.

(21) Appl. No.: 12/529,945

(22) PCT Filed: Mar. 3, 2008

(86) PCT No.: PCT/GB2008/000716
§ 371 (c)(1), (2), (4) Date: Sep. 4, 2009

(87) PCT Pub. No.: WO2008/107658
PCT Pub. Date: Sep. 12, 2008

(65) Prior Publication Data
US 2010/0112318 A1 May 6, 2010

(30) Foreign Application Priority Data

Mar. 7, 2007 (GB) .................................. 0704335.9

(51) Int. Cl.
*B01J 13/20* (2006.01)
*B05D 7/24* (2006.01)
*B41J 2/175* (2006.01)
*B41M 1/00* (2006.01)
*B41M 1/26* (2006.01)
*B41M 1/30* (2006.01)

(52) U.S. Cl. ..... 523/206; 101/491; 347/86; 427/213.33; 427/256; 427/288; 428/402.24

(58) Field of Classification Search ........................ None
See application file for complete search history.

(56) References Cited

U.S. PATENT DOCUMENTS 3,565,818 A 2/1971 Bayless et al. ................ 252/316
6,969,575 B2 * 11/2005 Inno .............................. 430/138

FOREIGN PATENT DOCUMENTS

EP 0 940 171 A2 9/1999
WO WO 2006/064193 A1 * 6/2006

* cited by examiner

*Primary Examiner* — Robert Sellers
(74) *Attorney, Agent, or Firm* — Morgan, Lewis & Bockius LLP

(57) ABSTRACT

A process for preparing an encapsulated particulate solid using an epoxy functional cross-linking agent and a carboxylic acid functional dispersant characterized in that the crosslinking is performed in the presence of a borate compound. The resultant solids are useful in, for example, ink jet printing inks where high optical density prints may be obtained.

15 Claims, No Drawings

PROCESS FOR PREPARING AN ENCAPSULATED PARTICULATE SOLID

This is a 371 filing based on PCT/GB2008/000716 filed Mar. 3, 2008 and claiming priority from Great Britain Application No. 0704335.9, filed Mar. 7, 2007.

This invention relates to a process for preparing an encapsulated particulate solid dispersed in a liquid medium, to the isolated encapsulated particulate solid and to the use of such solids in inks, especially ink jet printing inks.

Many inks, millbases, paints and the like require effective dispersants for uniformly dispersing a particulate solid in a liquid vehicle. The liquid vehicle may vary from highly polar (e.g. water) to highly non-polar liquids (e.g. toluene). Known dispersants tend to work effectively only with liquid vehicles within a range of polarities. Outside such polarities the particulate solid typically flocculates. Thus, a range of dispersants has been developed for liquid media of different polarities. Preparing dispersants which can successfully stabilise a particulate solid in a liquid medium comprising water and substantial amounts of organic solvents is particularly difficult.

Conventional dispersants are adsorbed onto the surface of the particulate solid by physical interactions. Many conventional dispersants suffer from a disadvantage in that they may readily be displaced from the surface of the particulate solid by a more strongly adsorbing material and this can result in destabilisation of the dispersion and flocculation.

The problems associated with conventional dispersants can be partly addressed by encapsulating the particulate solid within a cross-linked dispersant. The process of encapsulating a particulate solid with a cross-linked dispersant is typically performed in a liquid medium. A cross-linkable dispersant can be mixed with a particulate solid dispersed in a liquid medium, the dispersant then adsorbs onto the particulate solid surface and the dispersant can then be cross-linked via its cross-linkable groups utilising a cross-linking agent to "fix" the dispersant onto the particulate solid. Such an approach is described in our International Patent Application published as WO2006064193.

While the approach described in WO2006064193 provides very good results, there is a continuous need to improve the technology. We have now found that the presence of a borate compound during the cross-linking step leads to such improvements.

According to a first aspect of the present invention there is provided a process for preparing an encapsulated particulate solid dispersed in a liquid medium comprising cross-linking a dispersant with a cross-linking agent in the presence of a particulate solid and the liquid medium, thereby encapsulating the particulate solid within the cross-linked dispersant, wherein:

a) the dispersant has at least one carboxylic acid group;
b) the cross-linking agent has at least two epoxy groups; and
c) the cross-linking is performed in the presence of a borate compound.

Hitherto borate compounds have been used for a number of purposes which are unrelated to the present invention. For example, boric acid is sometimes dissolved in alcohol and used by fire jugglers and fire spinners to give a bright green flame.

Boric acid has also been used to treat yeast and fungal infections such as candidiasis and as prevention against athlete's foot. Boric acid has also been used as an insecticide for killing cockroaches, termites, fire ants, fleas and other insects.

The particulate solid may comprise and preferably is an inorganic or organic particulate solid material or mixture thereof which is insoluble in the liquid medium.

Examples of suitable particulate solids are inorganic and organic pigments; extenders and fillers for paints and plastics materials; disperse dyes and water-soluble dyes in liquid media which do not dissolve said dyes; optical brightening agents; textile auxiliaries for solvent dyebaths, inks and other solvent application system; particulate ceramic materials; magnetic particles (e.g. for use in magnetic recording media); biocides; agrochemicals; and pharmaceuticals.

Preferably the particulate solid is a colorant, more preferably a pigment.

A preferred particulate pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is another example of a suitable particulate solid. Preferred organic pigments are phthalocyanines, especially copper phthalocyanine pigments, azo pigments, indanthrones, anthanthrones, quinacridones and carbon black pigments.

Preferred inorganic particulate solids include: extenders and fillers, e.g. talc, kaolin, silica, barytes and chalk; particulate ceramic materials, e.g. alumina, silica, zirconia, titania, silicon nitride, boron nitride, silicon carbide, boron carbide, mixed silicon-aluminium nitrides and metal titanates; particulate magnetic materials e.g. magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof.

Where the process of the present invention is used to make encapsulated particulate solid dispersions for use in inks, for example ink jet printing inks, the pigment is preferably a cyan, magenta, yellow or black pigment. The particulate solid may be a single chemical species or a mixture comprising two or more chemical species (e.g. a mixture comprising two or more different pigments). In other words, two or more different particulate solids may be used in the process of the present invention.

The liquid medium may be non-polar but is preferably polar. "Polar" liquid media are generally capable of forming moderate to strong bonds, e.g. as described in the article entitled "A Three Dimensional Approach to Solubility" by Crowley et al in Journal of Paint Technology, Vol. 38, 1966, at page 269. Polar liquid media generally have a hydrogen bonding number of 5 or more as defined in the abovementioned article.

Examples of suitable polar liquid media include ethers, glycols, alcohols, polyols, amides and especially water.

Preferably, the liquid medium is or comprises water as this tends to result in a particularly stable and fine encapsulated particulate solid. Preferably, the liquid medium comprises from 1 to 100%, more preferably from 10 to 100%, especially from 20 to 90% and more especially from 30 to 80% water by weight. The remainder is preferably one or more polar organic liquids.

Preferred non-polar liquid media include non-halogenated aromatic hydrocarbons (e.g. toluene and xylene); halogenated aromatic hydrocarbons (e.g. chlorobenzene, dichlorobenzene and chlorotoluene); non-halogenated aliphatic hydrocarbons (e.g. linear and branched aliphatic hydrocarbons containing six or more carbon atoms, including fully and partially saturated), halogenated aliphatic hydrocarbons (e.g. dichloromethane, carbon tetrachloride, chloroform, trichloroethane); natural non-polar liquids (e.g. vegetable oil, sunflower oil, linseed oil, terpenes and fatty glycerides); and combinations thereof.

The liquid medium may comprise a mixture of liquids which may be polar or non-polar liquids. It is preferred that at least one component of the liquid medium is a polar liquid and more preferred that all of the components of the liquid medium are polar liquids.

When the liquid medium comprises more than one liquid said liquid medium may be in the form of a multi phase liquid (e.g. a liquid-liquid emulsion) but is preferably in the form of a single phase (homogeneous) liquid.

Preferably, the polar liquids other than water are water-miscible.

In a preferred embodiment the liquid medium comprises water and a water-miscible organic liquid. Such a liquid medium is preferred because it assists in dissolving and/or dispersing a wider range of cross-linking agents Preferred water-miscible organic liquids for inclusion into the liquid medium include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of dials having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone.

Preferably the liquid medium comprises water and 2 or more, especially from 2 to 8, water-miscible organic liquids.

Especially preferred water-miscible organic liquids are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol; and glycerol.

The weight ratio of water to water-miscible organic liquid when both are present in the liquid medium is preferably from 99:1 to 5:95, more preferably 95:5 to 50:50, especially 95:5 to 75:25.

Preferably, the liquid medium is not reactive towards either the cross-linking agent or the dispersant. Thus, it is preferred that the liquid medium is substantially free from components having amine, imine, thiol, carboxylic acid or epoxy groups.

The dispersant preferably has two or more and especially ten or more carboxylic acid groups per molecule.

When the cross-linking agent has two epoxy groups it is preferred that the dispersant has ten or more carboxylic acid groups.

The carboxylic acid group(s) may be present in the dispersant in the form of a free acid (—COOH) or in the form of a salt. The salt may be, for example, a metal ion, an ammonium, substituted ammonium, quaternary ammonium or pyridinium salt.

Preferably, the dispersant comprises and more preferably is a polymer. Preferably the dispersant comprises and more preferably is a polyurethane, polyester or more preferably a polyvinyl dispersant. The dispersant may be a combination of polymers which may be physically blended or chemically bonded together (e.g. grafted).

The carboxylic acid group(s) are preferably incorporated into the polymeric dispersant by means of copolymerising a monomer containing at least one carboxylic acid group. Preferred polyvinyl dispersants comprise at least one monomer residue from itaconic acid, maleic acid, fumaric acid, crotonic acid, more preferably methacrylic acid, acrylic acid and beta carboxy ethyl acrylate.

In the case of polyurethanes, the preferred method of incorporating carboxylic acid groups is by copolymerising a diol having a hindered carboxylic acid group. A preferred example of such a diol is dimethylol propanoic acid.

Polyesters having at least one carboxylic acid group can be prepared by reacting a diol monomer with an excess of a dicarboxylic acid monomer. Carboxylic acid group(s) can also be incorporated by copolymerising a diol having a hindered carboxylic acid group (as mentioned above) with a dicarboxylic acid monomer.

The function of the carboxylic acid group(s) in the dispersant is primarily to cross-link with the epoxy groups in the cross-linking agent. In addition, any unreacted carboxylic acid groups may assist in the stabilisation of the final encapsulated particulate solid against flocculation and aggregation. Carboxylic acid groups are effective as stabilising groups in polar and more especially aqueous media.

Where carboxylic acid group(s) are the only groups for stabilising the final encapsulated particulate solid dispersed in the liquid medium it is preferable to have a molar excess of carboxylic acid groups to epoxy groups to ensure that unreacted carboxylic acid groups remain after the cross-linking reaction has been completed. In one embodiment the ratio of moles of carboxylic acid groups to moles of epoxy groups is preferably from 10:1 to 1.1:1, more preferably from 5:1 to 1.1:1 and especially preferably from 3:1 to 1.1:1

The dispersant may optionally have other stabilising groups. The choice of the stabilising groups as well as the amounts of such groups will depend to a large extent on the nature of the liquid medium. Stabilising groups tend to be either hydrophilic in nature (e.g. for polar media) or hydrophobic in nature (e.g. for non-polar media).

Preferred polymeric dispersants are derived from both hydrophilic and hydrophobic monomers.

Hydrophilic monomers are those monomers comprising hydrophilic groups which may be ionic or non-ionic groups. The ionic groups may be cationic but are preferably anionic. Both cationic and anionic groups may be present in the dispersant to give amphoteric stabilisation. Preferred anionic groups are phenoxy, sulphonic acid, sulphuric acid, phosphonic, polyphosphoric and phosphoric acid groups which may be in the free acid or salt form as hereinbefore described. Preferred cationic groups are quaternary ammonium, benzalkonium, guanidine, biguanidine and pyridinium. These can be in the form of a salt such as a hydroxide, sulphate, nitrate, chloride, bromide, iodide and fluoride. Preferred non-ionic groups are glucoside, saccharide, pyrrolidone, acrylamide and especially hydroxy groups and poly(alkyleneoxide) groups, more preferably poly(ethyleneoxide) or poly(propyleneoxide) groups, especially groups of the formula —$(CH_2CH_2O)_nH$ or —$(CH_2CH_2O)_nC_{1-4}$-alkyl wherein n is from 3 to 200 (preferably 4 to 20). The dispersant can contain a single non-ionic group, several non-ionic groups throughout the dispersant or one or more polymeric chains containing non-ionic groups. Hydroxy groups can be incorporated using polymeric chains such as polyvinylalcohol, polyhydroxyl functional acrylics and celluloses, Ethyleneoxy groups can be incorporated using polymeric chains such as polyethyleneoxide.

Hydrophobic monomers are those monomers comprising hydrophobic groups.

Preferred hydrophobic groups are predominantly hydrocarbons, fluorocarbons, poly $C_{3-4}$-alkyleneoxy and alkyl siloxanes comprising less than three and more preferably no hydrophilic groups. The hydrophobic group is preferably a $C_3$-$C_{50}$ chain or propyleneoxide which can be pendant or in chain with the hydrophobic monomer.

In the case of a polymeric dispersant this may be a homopolymer, but is more preferably a copolymer.

The polymeric dispersants preferably comprise random polymers (having statistically short blocks or segments) but can comprise block or graft polymers (having longer blocks or segments). Polymeric dispersants may also comprise alternating polymers. The polymeric dispersants can be branched or star but are preferably linear. The polymeric dispersants may have two or more segments (e.g. block and graft copolymers) but are preferably random.

In embodiments where the polymeric dispersant has two or more segments it is preferred that at least one segment is hydrophobic and at least one segment is hydrophilic relative to each other. A preferred method for making hydrophilic and hydrophobic segments is by the copolymerisation of hydrophilic and hydrophobic monomers respectively. Where the dispersant has at least one hydrophilic and at least one hydrophobic segment the carboxylic acid group(s) can be situated in the hydrophobic segment, in the hydrophilic segment or in both.

Polyvinyl dispersants may be made by any suitable means. A preferred method for making polyvinyl dispersants is free radical polymerisation of vinyl monomers, especially (meth) acrylates and vinyl monomer containing aromatic groups such as vinyl naphthalene and especially styrenic monomers. Suitable free radical polymerisation methods include but are not limited to suspension, solution, dispersion and preferably emulsion polymerisation. Preferably, the vinyl polymerisation is carried out in a liquid composition comprising water.

Preferred polyvinyl dispersant comprise the residues from one or more (meth)acrylate monomers.

Preferably the polyvinyl dispersant is a copolymer.

Copolyvinyl dispersants which contain the residue of both hydrophilic and hydrophobic monomers are preferably substantially free from segments. Copolyvinyl dispersants can be made, for example, by free radical copolymerisation methods wherein the segment length is often statistically very short or effectively non-existent. Such are often referred to as "random" polymerisations. Copolyvinyl dispersants having segments can be made by polymerisation methods such as living polymerisations and especially group transfer polymerisation, atom transfer polymerisation, macromonomer polymerisation, graft polymerisation and anionic or cationic polymerisation.

Suitable hydrophilic vinyl monomers include non-ionic and ionic vinyl monomers.

Preferred non-ionic vinyl monomers are those containing saccharide, glucoside, amide, pyrrolidone and especially hydroxy and ethoxy groups.

Preferred examples of non-ionic vinyl monomers include hydroxy ethylacrylate, hydroxy ethyl methacrylate, vinyl pyrrolidone, ethoxylated (meth)acrylates and (meth)acrylamides.

Suitable ionic vinyl monomers may be cationic but are preferably anionic.

Preferred anionic vinyl monomers are those comprising phosphoric acid groups and/or sulphonic acid groups which may be in the free acid form or salts thereof. The types of salts are as described hereinbefore. Preferred examples are styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid), methacryloyloxymethyl sulfonic acid, methacryloyloxyethyl sulfonic acid, methacryloyloxypropyl sulfonic acid and methacryloyloxybutyl sulfonic acid), 2-acrylamido-2-alkylalkane sulfonic acids (for example, 2-acrylamido-2-methylethanesulfonic acid, 2-acrylamido-2-methylpropanesulfonic acid and 2-acrylamido-2-methylbutane sulfonic acid), 2-methacrylamido-2-alkylalkane sulfonic acids (for example, 2-methacrylamido-2-methylethanesulfonic acid, 2-methacrylamido-2-methylpropanesulfonic acid and 2-methacrylamido-2-methylbutanesulfonic acid), mono-(acryloyloxyalkyl)phosphates (for example, mono(acryloyloxyethyl)phosphate and mono(3-acryloyloxypropyl)phosphates) and mono(methacryloyloxyalkyl)phosphates (for example, mono(methacryloyloxyethyl)phosphate and mono (3-methacryloyloxypropyl)phosphate).

Preferred cationic vinyl monomers are those comprising quaternary amine, pyridine, guanidine and biguanidine groups.

Preferred hydrophobic vinyl monomers have no hydrophilic groups. Preferred hydrophobic vinyl monomers include $C_{1-20}$-hydrocarbyl (meth)acrylates, butadiene, styrene and vinyl naphthalene. Especially preferred are $C_{4-20}$-hydrocarbyl (meth)acrylates for example butyl (meth)acrylate, octyl (meth)acrylate, 2-ethyl hexyl (meth)acrylate, isobornyl acrylate, lauryl acrylate and stearyl acrylate. A particularly preferred hydrophobic vinyl monomer is 2-ethyl hexyl methacrylate. The hydrocarbyl groups in these hydrophobic vinyl monomers may be branched but are preferably linear.

Polyesters are typically made by esterification of a dicarboxylic acid with a diol. In place of the carboxylic acid an acid chloride, anhydride or alkyl (typically methyl or ethyl) ester of the acid can be used. Small amounts of monofunctional and/or tri or higher functional monomers can be used. Mixtures of carboxylic acids and/or alcohols can be used. Another route to the preparation of polyesters is the well known ring opening of cyclic lactones such as caprolactone. Caprolactone can be polymerised to give diols which may be used in both polyester or polyurethane synthesis.

Preferred hydrophobic monomers for making polyesters are esters, acids, acid chlorides anhydrides, cyclic lactones and alcohols containing $C_{1-50}$-hydrocarbylene more preferably $C_{4-50}$-hydrocarbylene, and especially $C_{6-20}$-hydrocarbylene residues. These hydrocarbylene residues preferably comprise alkylene, cycloalkylene, arylene, aralkylene and/or alkarylene residues. Hydrophobic monomers preferably contain no hydrophilic groups other than those needed for the polyester polymerisation. Other preferred hydrophobic monomers include those containing $C_{3-4}$-alkyleneoxy (especially propyleneoxy), fluorocarbons and siloxanes. Hydrophobic urethanes, polycarbonates and polyvinyls can be prepared with carboxylic acid or hydroxy groups such that they may be incorporated into polyesters.

Preferred hydrophilic monomers for making polyesters contain hydroxy groups and/or acid groups which are unreacted, or ethyleneoxy groups. Especially preferred are polyethyleneoxy diols.

Suitable hydrophilic monomers for making polyesters may comprise sulphonic acid with hydroxy and/or carboxylic acid groups, for example aromatic dicarboxylic acids having an ionised sulphonate group. Particularly preferred is sodio-5-sulphoisophthalic acid (SSIPA). Other useful monomers which have two or more groups which readily undergo an ester condensation reaction and have one or more sulphonic acid groups are dihydroxy aryl monomers having at least one sulphonic acid group.

A further method for introducing hydrophilic residues is to incorporate polyester monomers containing protected hydrophilic groups (such as silylated hydroxyl groups) which are de-protected after polymerisation. The advantage of protection/de-protection is that the molecular weight and remaining acid/hydroxy functionality can be separately controlled.

Polyurethanes are preferably made by the condensation of a di-isocyanate with a diol. Small amounts of monofunctional and/or tri or higher functional monomers can be used. Mixtures of isocyanates and/or alcohols can be used.

Preferred hydrophobic monomers for making polyurethanes include isocyanates and alcohols comprising $C_{1-50}$-hydrocarbylene more preferably $C_{4-50}$-hydrocarbylene, and especially $C_{6-20}$-hydrocarbylene residues. Hydrocarbylene residues can comprise alkylene, cycloalkylene, arylene, aralkylene and/or alkarylene residues. Preferably the hydrophobic monomers contain no hydrophilic group other than those needed for the urethane polymerisation. Other preferred hydrophobic monomers for making polyurethanes contain siloxane and fluorocarbon groups. Hydrophobic polycarbonates, polyesters and polyvinyls can be prepared with isocyanate or hydroxy groups such that they can be incorporated into a polyurethane.

Examples of suitable hydrophobic isocyanates include ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, and 1,5-naphthylene diisocyanate. Mixtures of the polyisocyanates can be used, particularly isomeric mixtures of the toluene diisocyanates or isomeric mixtures of the diphenylmethane diisocyanates (or their hydrogenated derivatives), and also organic polyisocyanates which have been modified by the introduction of urethane, allophanate, urea, biuret, carbodiimide, uretonimine or isocyanurate residues.

Preferred hydrophobic alcohols contain $C_{3-4}$-alkyleneoxy (especially propyleneoxy), fluorocarbon, siloxane, polycarbonate and $C_{1-20}$-hydrocarbyl poly (meth)acrylate residues.

Preferred examples of hydrophobic diols for making polyurethanes include hexane diol, cyclohexane diol, propyleneoxy dials, diols from polycaprolactone, diols from polyvalerolactone, poly$C_{1-20}$-alkyl (meth)acrylate diols, siloxane diols, fluorocarbon diols and alkoxylated bisphenol A diols.

Preferred hydrophilic monomers for making polyurethanes contain ethyleneoxy, sulphonic acid, phosphoric acid or quaternary ammonium groups. A preferred example of a monomer containing a sulphonic acid group is bis(2-hydroxyethyl)-5-sodiosulphoisophthalate. Preferred examples of such monomers containing quaternary ammonium groups are quaternary ammonium salt diols for example dimethanol diethyl ammonium bromide. The acidic and/or quaternary ammonium group may be in the form of a salt as hereinbefore described. A preferred polyurethane monomer containing an ethyleneoxy groups is polyethyleneoxide diol and especially the polyoxalkyene amines as described in EP 317,258 the teaching of which is incorporated herein.

Hydrophilic residues can be introduced into polyurethanes by using excess hydroxy groups over isocyanate groups so that the resulting hydrophilic polyurethanes have unreacted hydroxy groups after polymerisation. Also, monomers containing protected hydrophilic groups such as silylated hydroxy groups can also be used. Said protected groups can be de-protected after polymerisation.

The dispersant is preferably chosen to suit the liquid medium to be used in the process for preparing the encapsulated particulate solid and also the liquid vehicle to be used in any final intended composition in which the encapsulated particulate solid will be used (e.g. inks). Thus, for example, when the encapsulated particulate solid is to be used in an aqueous ink jet printing ink the dispersant preferably has a predominantly hydrophilic character. Similarly, when the encapsulated particulate solid is to be used in an oil-based (non-aqueous) paint or ink the dispersant preferably has a predominantly hydrophobic character.

In one embodiment the cross-linking reaction between the carboxylic acid and epoxy groups is performed at a temperature of less than 100° C. and a pH of at least 6.

In embodiments where the cross-linking agent has one or more oligomeric dispersing group the dispersant may have any acid value provided that it remains a dispersant in character and provided that the dispersant has sufficient carboxylic acid groups to be effectively cross-linked with the cross-linking agent.

In embodiments where the cross-linking agent has one or more oligomeric dispersing group the dispersant preferable has acid value of at least 125 mg KOH/g.

In all embodiments the acid value (AV) of the dispersant is preferably from 130 to 320 and more preferably from 135 to 250 mg KOH/g. We have found that dispersants having such acid values provide resultant encapsulated particulate solid which exhibits improved stability. This improved stability is especially useful in the demanding liquid vehicles used in ink jet printing, with more difficult to disperse particulate solids and with cross-linking agents which have little and especially no oligomeric dispersing groups.

Preferably, the dispersant has a number average molecular weight of from 500 to 100,000, more preferably from 1,000 to 50,000 and especially from 1,000 to 35,000. The molecular weight is preferably measured by gel permeation chromatography ("GPC").

The dispersant need not be totally soluble in the liquid medium. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium which do not settle or separate on standing.

It is preferred that the dispersant is substantially soluble in the liquid medium giving rise to clear or hazy solutions.

Preferred random polymeric dispersants tend to give clear compositions whilst less preferred polymeric dispersants with two or more segments tend to give rise to the aforementioned hazy compositions in liquid media.

In a preferred embodiment of the present invention the dispersant is adsorbed onto the particulate solid prior to cross-linking so as to form a relatively stable dispersion. This dispersion is then cross-linked using the cross-linking agent in the presence of a borate compound. This pre-adsorption and pre-stabilisation in particular distinguishes the present invention from coacervation approaches whereby a polymer or prepolymer (which is not a dispersant) is mixed with a particulate solid, a liquid medium and the cross-linker and only during or after cross-linking does the resultant cross-linked polymer precipitate onto the particulate solid.

In embodiments where the dispersant has an acid value of at least 125 mg KOH/g the cross-linking agent may have no oligomeric dispersing groups, but preferably the cross-linking agent has one or more oligomeric dispersing groups.

The term oligomer as used herein is not limited to any upper molecular weight or to any upper limit regarding the number of repeat units.

The cross-linking agents having one or more oligomeric dispersing group increase the stability of the resulting encapsulated particulate solid. This increased stability is especially useful in the demanding liquid vehicles used in ink jet printing, with more difficult to disperse particulate solids and/or with dispersants having acid values of less than 125 mg KOH/g.

The oligomeric dispersing group preferably is or comprises polyalkyleneoxide, more preferably a poly$C_{2-4}$-alkyleneoxide and especially a polyethyleneoxide. The polyalkyleneoxide groups provide stearic stabilisation which improves the stability of the resulting encapsulated particulate solid.

Preferably the polyalkyeneoxide contains from 3 to 200, more preferably from 5 to 50 alkyleneoxide and especially from 5 to 20 alkyleneoxide repeat units.

In all embodiments the preferred cross-linking agents having at least two epoxy groups are epichlorohydrin derivatives.

Preferred cross-linking agents have two epoxy groups.

Preferred cross-finking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred cross-linking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred cross-linking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polygycidyl ether.

When the dispersant comprises only one carboxylic acid group the cross-linking agent is preferably a polymer comprising at least ten epoxy groups and optionally one or more oligomeric dispersing group. A preferred example of a polymeric cross-linking agent is a polyvinyl copolymer comprising glycidyl (meth)acrylate.

Preferably the cross-linking agent is soluble in the liquid medium, especially where the liquid medium is aqueous. More preferably the cross-linking agent has a solubility in water such that a mixture of water and cross-linking agent containing 1% by weight of the cross-linking agent is in the form of a solution at a temperature of 25° C.

We have found that cross-linking agents which are substantially insoluble in the liquid medium tend to cause coagulation or agglomeration of the particulate solid.

The cross-linking agent preferably has one or more ethylene glycol groups to help solubilise the cross-linking agent.

One or more cross-linking agents can be used to cross-link the carboxylic acid group(s) in the dispersant.

When more than one cross-linking agent is used these may have the same or different numbers of epoxy groups.

It is preferred that the only cross-linking groups present on the cross-linking agent are epoxy groups.

Thus in one embodiment the present invention provides a process for preparing an encapsulated particulate solid dispersed in a liquid medium comprising cross-linking a dispersant with a cross-linking agent in the presence of a particulate solid and the liquid medium, thereby encapsulating the particulate solid within the cross-linked dispersant, wherein:
  a) the dispersant has at least one carboxylic acid group;
  b) the cross-linking agent has at least two epoxy groups and one or more ethylene glycol groups; and
  c) the cross-linking reaction between the carboxylic acid and epoxy groups is performed at a temperature of less than 100° C. and a pH of at least 6 in the presence of a borate compound.

In a further embodiment the cross-linking agent has one or more oligomeric dispersing group and the dispersant has an acid value of at least 125 mg KOH/g. We have found that the combined effects from both the oligomeric dispersing groups in the cross-linking agent and the dispersant having an acid value of at least 125 mg KOH/g provides encapsulated particulate solids with excellent stability in liquid vehicles.

It is known that the reaction between carboxylic acid groups and epoxy groups can be used as a means of cross-linking. However, such reactions tend to be done with Lewis acids and/or at low pH (less than 5) and at temperatures of approximately 150° C. We have surprisingly found that when the epoxy/carboxylic acid cross-linking reaction is effected at a pH of at least 6 using a borate compound the reaction proceeds particularly well.

Low temperatures for cross-linking are preferred as this results in lower levels of flocculation and particle size growth of the particulate solid in the liquid medium. Preferably, the cross-linking reaction is performed at a temperature from 10° C. to 90° C. and more preferably from 30° C. to 70° C.

The pH for the cross-linking reaction is preferably from 7 to 14, more preferably from 7 to 12 and especially preferably from 8 to 11.

The borate compound preferably comprises boric acid, metaboric acid, tetraboric acid or pyroboric acid, or a mixture thereof, or a salt thereof.

Preferred salts of the borate compound are ammonium, substituted ammonium and alkali metal salts, especially salts with ammonia, sodium, lithium, potassium or mixed salt thereof. However it is preferred that the borate compound is in or substantially in the free acid form. Boric acid is particularly preferred.

Commonly borates include waters of crystallisation and these are included within the scope of the present invention. For example, disodium pyroborate typically has ten waters of crystallisation and can be obtained commercially as $Na_2B_4O_7 \cdot 10H_2O$.

Before the cross-linking reaction starts the carboxylic acid groups in the dispersant may be in the form of the salt and/or the free acid as hereinbefore described. However in order to better effect the reaction between carboxylic acid groups and epoxy groups at a temperature of below 100° C. we have found that it is important that at least some of the carboxylic acid groups are present in the form of the salt. The salt form may be obtained by adjusting the pH (of all the components present in the process according to the first aspect of the present invention) to at least 6 prior to cross-linking.

The pH adjustment can be done by adding any suitable base. Preferred bases include metal hydroxides, oxides, carbonates as well as amines, substituted amines and alkanolamines. Especially preferred bases are the alkali metal hydroxides, ammonia, triethylamine and triethanolamine. An especially preferred alkali metal hydroxide is potassium hydroxide.

The time for the cross-linking reaction depends to some extent on the temperature and the pH. However, a preferred time is from 1 to 24 hours, more preferably from 1 to 8 hours.

Preferably, the cross-linking is performed by a process comprising mixing the particulate solid, the dispersant, the cross-linking agent and the liquid medium.

The components may be mixed by any suitable method, e.g. shaking, stirring and so on.

Preferably, the cross-linking is performed by a process comprising mixing the a composition comprising the following components in the specified proportions:
 a) 30 to 99.7 parts, preferably 50 to 97 parts of the liquid medium;
 b) 0.1 to 50 parts, preferably 1 to 30 parts of the particulate solid;
 c) 0.1 to 30 parts, preferably 1 to 30 parts of the dispersant;
 d) 0.001 to 30 parts, preferably 0.01 to 10 parts of the cross-linking agent;
 e) 0.5 to 5 molar equivalents of borate compound(s) per mole of epoxy groups in the cross-linking agent;
wherein the parts are by weight and the sum of the parts a)+b)+c)+d)+e)=100.

Preferably the composition contains 0.75 to 4, more preferably 0.9 to 3 molar equivalents of borate compound per mole of epoxy groups in the cross-linking agent. For example, if the composition contains 1 mole of a diepoxide, this would require 1 to 10 moles of borate compound to satisfy the requirement of 0.5 to 5 molar equivalents of borate compound per mole of epoxy groups in the cross-linking agent. Similarly, if the composition contains 0.2 moles of a triepoxide, this would require 0.45 to 2.4 moles of borate compound to satisfy the requirement of 0.75 to 4 molar equivalents of borate compound per mole of epoxy groups in the cross-linking agent.

The particulate solid, the liquid medium and the dispersant may be mixed in any order or simultaneously. The mixture may be subjected to a mechanical treatment to reduce the particle size of the particulate solid to a desired size, for example by ball milling, bead milling, gravel milling or by more elaborate techniques such as ultrasonication, microfluidizing (using a Microfluidics™ machine) or using hydrodynamic cavitation (using for example the CaviPro™ device) until a dispersion is formed. The particulate solid may be treated to reduce its particle size independently or in admixture with the liquid medium and/or the dispersant. The remaining component or components may then be added to provide a mixture suitable for the present invention.

If desired the mixture may be filtered or centrifuged to remove any poorly dispersed or oversized particulate material prior to cross-linking. In particular, the process preferably comprises filtering a mixture comprising the dispersant, particulate solid and liquid medium prior to cross-linking, preferably through a filter having a pore size of less than 10, more preferably less than 5 and especially less than 1 micron.

If the cross-linking agent is present during mechanical treatment of the particulate solid this can result in undesirable pre-cross-linking of the dispersion before the particle size of the solid has been fully reduced. When the particulate as solid is milled in the presence of the dispersant and the liquid medium the temperature is preferably not greater than 40° C. and especially not greater than 30° C.

The cross-linking agent is preferably added to a mixture comprising the particulate solid, dispersant and liquid medium after any mechanical treatment to reduce the particle size of the particulate solid. Cross-linking can occur whilst the cross-linking agent is being added but it is more preferred that at least the greater part of the cross-linking occurs after complete addition of the cross-linking agent. This facilitates more uniform dispersion of the cross-linking agent throughout the composition and results in more uniform cross-linking.

To inhibit cross-linking whilst the cross-linking agent is being added to a mixture comprising the particulate solid, dispersant and liquid medium, the cross-linking agent is preferably added to said mixture at a temperature below 40° C. and especially below 30° C.

The process preferably results in an encapsulated particulate solid having a Z-average particle size of at most 50% greater than the Z-average particle size of the particulate solid prior to addition of the cross-linking agent.

Preferably, the encapsulated particulate solids have a Z-average particle size of less than 500 nm, more preferably from 10 to 500 nm and especially from 10 to 300 nm. Conventionally, particulate solids having a Z-average size of less than 500 nm are difficult to effectively stabilise. Particulate solids of this size are particularly useful in paints and inks, especially ink jet printing inks.

The Z-average particle size may be measured by any means known but a preferred method is by photon correlation spectroscopy devices available from Malvern™ or Coulter™.

The process of the present invention is capable of being performed at moderate temperatures and with cross-linking agents having a good toxicology profile. The process provides reduced levels of aggregation and/or flocculation and minimal growth in the particle size of the particulate solid. This process is therefore particularly useful in applications where small particle size is important. For example, in ink jet printing large particles are undesirable because they can block the tiny nozzles used in print heads. The process of the present invention is particularly useful for providing encapsulate particulate solids used in ink jet printing where good optical density of prints are desirable. For some reason we cannot currently explain, dispersions made by the current process can be used in inks on a variety of different substrates to give deeply coloured prints. Furthermore, the ability to use low temperatures enables encapsulation and dispersion of temperature-sensitive particulate solids, e.g. pharmaceuticals and agrochemicals.

Any small amounts of aggregated and flocculated material which may be formed during the encapsulation process are preferably measured by filtration and weighing of the dry flocculated and aggregated material retained on the filter. Preferably a filter having a pore size of 1 micron is used for this. It is also preferable to pre-filter the components used in the process according to the first aspect of the present invention prior to heating and starting the cross-linking reaction. Again this filter preferably has a pore size of 1 micron. In this way only the aggregated and flocculated material which results from the cross-linking reaction is measured rather than also measuring material originating from, for example, insufficient mechanical dispersion of the particulate solid.

It is also possible to use optical microscopy either by visual qualitative assessment or by quantitative digital image capture and analysis to measure the extent of aggregation and/or flocculation during the encapsulation reaction.

According to a second aspect of the present invention there is provided an encapsulated particulate solid dispersed in the liquid medium obtainable or obtained by the process of the first aspect of the present invention.

The resultant encapsulated particulate solid is itself particulate. This is to say, this invention does not relate to any form of cross-linking which takes place on drying or which gels the components into an immobile solid or semi-solid.

It is preferred that substantially all of the encapsulated particulate solid particles comprise a single solid particle encapsulated within a cross-linked dispersant.

If desired the process may further comprise the step of isolating the encapsulated particulate solid from the liquid medium. This is preferably achieved by, for example, evaporating the liquid medium, or less preferably by precipitation or flocculation of the encapsulated particulate solid followed by filtration.

Preferred methods of evaporation include freeze drying, spray drying and agitated drying. Preferred methods of precipitation and flocculation include the addition of metal salts and centrifugation.

According to a third aspect of the present invention there is provided an encapsulated particulate solid obtainable or obtained by the process of isolating said encapsulated particulate solid from the encapsulated particulate solid dispersed in the liquid medium according to the second aspect of the present invention.

The encapsulated particulate solid prepared by the process according to the first aspect of the present invention is useful for providing compositions comprising a liquid vehicle and an encapsulated particulate solid. The term "liquid vehicle" refers to the liquid or liquids present in an end use formulation, for example, an ink, paint or the like.

Preferably, the encapsulated particulate solid is dispersed in the liquid vehicle. More preferably said dispersion is substantially uniform.

Thus, according to a fourth aspect of the present invention there is provided a composition comprising a liquid vehicle and an encapsulated particulate solid obtained or obtainable by the process according to the first aspect of the present invention.

The compositions may be prepared by adding one or more liquids to the product of the process and/or by concentrating the product of the process and/or or by isolating the product of the process and mixing the isolated encapsulated particulate solid with a liquid vehicle. Preferably, the composition is prepared by adding one or more desired liquid vehicle components to the encapsulated particulate solid dispersed in the liquid medium resulting from the process according to the first aspect of the present invention. This latter process, which does not isolate the encapsulated particulate solid (in a "dry" state), tends to result in smaller particle size of the encapsulated particulate solid with the liquid vehicle.

Preferably, the above composition is an ink wherein the particulate solid is a colorant and more preferably a pigment.

The liquid vehicle may be identical to or different from the liquid medium used in the process for preparing the encapsulated particulate solid. That is to say in some instances the product of the process of the present invention may be directly useful in an end use application such as an ink without the need to change the liquid components in any way.

It is often desirable that the liquid vehicle comprises high proportions of water and that further liquids required to make the desired composition (e.g. an ink) are added after the process according to the first aspect of the present invention has been performed.

In the case of ink jet printing compositions it is preferable that the liquid vehicle comprises both water and an organic liquid which is preferably a water-miscible organic liquid. Preferred water-miscible organic liquids are as hereinbefore described. The preferred ratios of water to water-miscible organic liquid are as hereinbefore described.

A preferred composition comprises:
  a) from 0.1 to 50 parts, more preferably from 1 to 25 parts, of an encapsulated particulate solid obtainable or obtained by a process according to the first aspect of the present invention;
  b) from 50 to 99.9 parts, more preferably from 99 to 75 parts, of a liquid vehicle comprising water and/or a water-miscible organic liquid;

wherein all parts are by weight and components a) and b) add to 100 parts.

The compositions of the present invention are particularly suitable for use in or as ink jet printing inks, especially where the particulate solid is a pigment.

In the case of ink jet printing, the composition according to the fourth aspect of the present invention preferably has a viscosity of less than 30 mPa·s more preferably less than 20 mPa·s and especially less than 10 mPa·s when measured at a temperature of 25° C.

In the case of ink jet printing it is preferred that the composition according to the fourth aspect of the present invention has a surface tension from 20 to 65 dynes/cm, more preferably from 25 to 50 dynes/cm when measured at a temperature of 25° C.

The ink jet printing compositions of the present invention may also comprise additional components suitable for use in ink jet printing inks, for example viscosity modifiers, pH buffers (e.g. 1:9 citric acid/sodium citrate) corrosion inhibitors, biocides, dyes and/or kogation reducing additives.

According to a fifth aspect of the present invention there is provided a process for printing an image on a substrate comprising applying a composition according to the fourth aspect of the present invention to the substrate, preferably by means of an ink jet printer.

According to a sixth aspect of the present invention there is provided a paper, a plastic film or a textile material printed with a composition according to the fourth aspect of the present invention, preferably by means of an ink jet printer. Preferred papers are plain or treated papers which may have an acid, alkaline or neutral character. Examples of commercially available papers include, Photo Paper Pro (PR101), Photo Paper Plus (PP101), Glossy Photo Paper (GP401), Semi Gloss Paper (SG101), Matte Photo Paper (MP101), (all available from Canon); Premium Glossy Photo Paper, Premium Semi gloss Photo Paper, ColorLife™, Photo Paper, Photo Quality Glossy Paper, Double-sided Matte Paper, Matte Paper Heavyweight, Photo Quality Inkjet Paper, Bright White Inkjet Paper, Premium Plain Paper, (all available from Seiko Epson Corp); HP All-In-One Printing Paper, HP Everyday Inkjet Paper, HP Everyday Photo Paper Semi-glossy, HP Office Paper, HP Photo Paper, HP Premium High-Gloss Film, HP Premium Paper, HP Premium Photo Paper, HP Premium Plus Photo Paper, HP Printing Paper, HP Superior Inkjet Paper, (all available from Hewlett Packard Inc.); Everyday Glossy Photo Paper, Premium Glossy Photo Paper, (both available from Lexmark Inc.); Matte Paper, Ultima Picture Paper, Premium Picture Paper, Picture Paper, Everyday Picture Paper (available from Kodak Inc.). The plastic film may be opaque or transparent. Transparent plastic films which are suitable for use as overhead projector slides, include for example polyesters (especially polyethylene terephthalate), polycarbonates, polyimides, polystyrenes, polyether sulphones, cellulose diacetate and cellulose triacetate films.

According to a seventh aspect of the present invention there is provided an ink jet printer cartridge comprising a chamber and a composition according to the fourth aspect of the present invention wherein said composition is present in the chamber.

Encapsulated particulate solids obtainable or obtained by the process of the present invention may also be used in surface coatings and paints which comprise an encapsulated particulate solid, a liquid vehicle and a binder. The particulate solid is preferably a colorant, an extender or a filler. As with inks, the paint can be made using the isolated encapsulated particulate solid but it is more preferred to use the encapsulated particulate solid dispersed in the liquid medium which results from the process according to the first aspect of the invention.

Thus, according to an eighth aspect of the present invention there is provided a composition comprising an encapsulated particulate colorant, extender or filler obtainable or obtained by a process according to the first aspect of the present invention, a binder and a liquid vehicle. The binder is a polymeric material capable of binding the composition after the liquid medium has evaporated away and/or been absorbed into the substrate.

Suitable binders include natural and synthetic polymers. Preferred binders include poly(meth)acrylates, polystyrenics, polyesters, polyurethanes, alkyds, polysaccharides (e.g. cellulose) and proteins (e.g. casein). Preferably, the binder is present in the composition at more than 100%, more preferably 200%, even more preferably 300% and most preferably more than 400% based on the weight of the encapsulated particulate solid.

The invention is further illustrated by the following Examples in which all parts and percentages are by weight unless otherwise stated.

Preparation of Dispersant (1)

A monomer feed composition was prepared by mixing methacrylic acid (172 parts), methyl methacrylate (478 parts), 2-ethylhexyl methacrylate (350 parts) and isopropanol (375 parts). An initiator feed composition was prepared by mixing 2,2'-azobis(2-methylbutyronitrile) (22.05 parts) and isopropanol (187.5 parts).

Isopropanol (187.5 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were both fed into the reactor over 2 hours. The reactor vessel contents were maintained at 80° C. for a further 4 hours before cooling to 25° C. The resulting dispersant was then isolated from the reactor vessel contents by rotary evaporation under reduced pressure. This was designated as Dispersant (1). Dispersant (1), was an acrylic copolymer which had a number average molecular weight of 11,865, an acid value of 112 mg KOH/g, a weight average molecular weight of 29,225 and a polydispersity of 2.5 as measured by GPC.

Preparation of Dispersants (2) to (4)

Step (i)

Monomer feed compositions (2) to (4) were prepared by mixing the components in each row of Table 1:

TABLE 1

| Monomer feed composition | methyl methacrylate | methacrylic acid | 2-ethylhexyl methacrylate | Isopropanol |
|---|---|---|---|---|
| (2) | 478 | 172 | 350 | 375 |
| (3) | 478 | 172 | 350 | 375 |
| (4 | 478 | 172 | 350 | 375 |

Step (ii)

Initiator feed compositions (2) to (4) were prepared by mixing the components in each row of Table 2:

TABLE 2

| Initiator feed composition | 2,2'-azobis(2-methylbutyronitrile) | Isopropanol |
|---|---|---|
| (2) | 93.71 | 187.5 |
| (3) | 37.48 | 187.5 |
| (4 | 22.05 | 187.5 |

Step (iii)

Polymerisation to Prepare Dispersants (2) to (4).

Dispersants (2) to (4) were prepared and isolated in exactly the same way as Dispersant (1) except that the monomer feed compositions (2) to (4) prepared in step (i) and the initiator feed compositions (2) to (4) prepared in step (ii) were used in place of those used in the preparation of Dispersant (1).

The molecular weights of Dispersants (2) to (4) as established by GPC were as tabulated in Table 3:

TABLE 3

| Dispersant | Weight average molecular weight | Number average molecular weight | Acid Value (mg KOH/g) |
|---|---|---|---|
| (2) | 10,452 | 5,422 | 112 |
| (3) | 19,803 | 11,111 | 112 |
| (4) | 28,992 | 15,422 | 112 |

Dispersant Solutions (1) to (4)

Dispersants (1) to (4) (150 parts) were each dissolved in water (470 parts) and neutralised with potassium hydroxide aqueous solution to give an aqueous solution having a pH of about 9. This resulted in Dispersant Solutions (1) to (4) which contained approximately 24% by weight of Dispersant.

Millbase (1)

A particulate solid (C.I. Pigment Blue 15:3, 60 parts, ex Clariant) was mixed with Dispersant Solution (1) (340 parts). The mixture was milled in a Blackley mill for a period of 3 hours. This resulted in a millbase designated as Millbase (1) comprising a particulate solid of Z-average particle size of 170 nm, a pH of 8.7 and a pigment content of 15% by weight.

Millbases (2) to (8)

A particulate solid (C.I. Pigment Blue 15:3 or Carbon black) was mixed with one of the Dispersant solutions (2) to (4) as described in Table 4. This mixture was then made up to 400 parts with water. The mixture was milled in a vertical Blackley bead mill for several hours.

TABLE 4

| Millbase | Dispersant | Colour | Pigment | Pigment amount (parts) | Neat Dispersant amount (parts) | Milling time (hrs) | Z-average particle Size (nm) |
|---|---|---|---|---|---|---|---|
| (2) | (2) | Cyan | C.I. Pigment Blue 15:3 | 40 | 34 | 4 | 101 |
| (3) | (3) | Cyan | C.I. Pigment Blue 15:3 | 40 | 22 | 4 | 104 |
| (4) | (4) | Cyan | C.I. Pigment Blue 15:3 | 40 | 28 | 4 | 118 |
| (5) | (4) | Black | M700 | 40 | 22 | 5 | 153 |
| (6) | (4) | Black | N160IQ | 40 | 22 | 5 | 133 |
| (7) | (4) | Black | N160IQ | 40 | 22 | 5 | 133 |
| (8) | (4) | Black | M700 | 40 | 22 | 5 | 153 |

C.I. Pigment Blue 15:3 is a copper phthalocyanine-based pigment.
M700 is Monarch ™ 700 a carbon black available from Cabot Corp.
N160IQ is Nipex ™ 160IQ a carbon black available from Degussa.

The amount of Dispersant indicated in Table 4 is that of the neat dispersant not the dispersant solution. Thus, for example, 1 part of neat Dispersant corresponds to 5 parts of a Dispersant solution containing 20% by weight of Dispersant.

After milling the final Z-average particle size was measured. The results are tabulated in the last column of Table 4.

EXAMPLE 1

Encapsulated Particulate Solid Dispersion (1)

Boric acid (0.06 parts) followed by polyethylene glycol diglycidyl ether having a number averaged molecular weight of about 526 (i.e. the cross-linker) (0.229 parts supplied by Aldrich having the Catalogue No 47, 569-6) may be slowly added to Millbase (1) (50 parts) at a temperature of about 25° C., the mixture is then heated and stirred for 6 hours at a temperature of 40 to 50° C. The pH of the mixture during the cross-linking reaction is 9.5.

EXAMPLES 2 TO 8

Encapsulated Particulate Solid Dispersions (2) to (8)

Encapsulated Particulate Solid Dispersions (2) to (8) may be prepared in exactly the same way as Encapsulated particulate solid dispersion (1) except that in place of the Millbase (1) there is used the Millbase indicated in Table 5 and the amounts of polyethylene glycol diglycidyl ether used and the pH during the cross-linking reaction are as described in Table 5:

TABLE 5

| Millbase | Encapsulated particulate solid dispersion | Polyethylene glycol diglycidyl ether amount (parts) | Boric acid (parts) |
|---|---|---|---|
| (2) | (2) | 2.515 | 0.6 |
| (3) | (3) | 1.627 | 0.4 |
| (4) | (4) | 1.726 | 0.45 |
| (5) | (5) | 1.627 | 0.42 |
| (6) | (6) | 1.627 | 0.41 |
| (7) | (7) | 1.899 | 0.46 |
| (8) | (8) | 1.356 | 0.68 |

EXAMPLES 9 TO 15

Preparation of Ink Jet Printing Inks

Encapsulated particulate solid dispersions (2) to (8) (containing 3 parts of neat particulate solid) may be converted into ink jet printing inks (2) to (8) shown in Table 6, by mixing with butyl Cellosolve™ (10 parts), butyl Carbitol™ (16 parts), pyrrolidone (5 parts), surfactant (1 part) and sufficient water to give a total of 100 parts.

TABLE 6

| Example | Ink Jet Printing Ink | Derived from Millbase |
|---|---|---|
| 9 | Ink (2) | (2) |
| 10 | Ink (3) | (3) |
| 11 | Ink (4) | (4) |
| 12 | Ink (5) | (5) |
| 13 | Ink (6) | (6) |
| 14 | Ink (7) | (7) |
| 15 | Ink (8) | (8) |

EXAMPLES 16 AND 17

Preparation of Dispersants (9) and (10) Having AV's of 154 and 112 Respectively

A monomer feed composition was prepared by mixing methacrylic acid (MAA), methyl methacrylate (MMA), 2-ethylhexylmethacrylate (2EHMA) and isopropanol. An initiator feed composition was prepared by mixing 2,2'-azobis(2-methylbutyronitrile) (AZBN) and isopropanol (187.5 parts). The monomer and initiator parts by weight are in Table 7:

TABLE 7

| Dispersant | MMA (parts) | MAA (parts) | 2EHMA (parts) | AZBN (parts) | Mw | Mn | AV |
|---|---|---|---|---|---|---|---|
| Dispersant (9) | 478 | 236.5 | 350 | 22.05 | 30048 | 17119 | 154 |
| Dispersant (10) | 413.5 | 172 | 350 | 22.05 | 30105 | 16005 | 112 |

Isopropanol (187.5 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were both fed into the reactor over 2 hours. The reactor vessel contents were maintained at 80° C. for a further 4 hours before cooling to 25° C. The dispersant was then isolated from the reactor vessel contents by rotary evaporation under reduced pressure. The Mw and Mn and acid values for the resultant dispersants are given in Table 7.

Dispersant Solution (9) (AV 154)

Dispersant (9) (150 parts) was dissolved in water and neutralised with potassium hydroxide aqueous solution to give an aqueous solution of pH 10.1 which was designated as Dispersant Solution (9). The polymer content was 30.6%

Dispersant Solution (10) (AV 112)

Dispersant (10) (150 parts) was dissolved in water and neutralised with potassium hydroxide aqueous solution to give an aqueous solution of pH 10.9 which was designated as Dispersant Solution (10). The polymer content was 21.2%

Pigment Dispersion (9)

Pigment Blue 15:4 aqueous paste (ex. Sun Chemicals, 260 parts) was mixed with Dispersant Solution (9) (147 parts) and water (192 parts). The mixture was milled in a Mini-Zeta bead mill for a period of 3 hours. The dispersion had a particle size (d90) of 100 nm. The dispersion had a pigment content of 15% by weight.

Pigment Dispersion (10)

Pigment Blue 15:4 aqueous paste (ex. Sun Chemicals, 260 parts) was mixed with Dispersant Solution (10) (212 parts) and water (127 parts). The mixture was milled in a Mini-Zeta bead mill for a period of 3 hours. The dispersion had a particle size (d90) of 115 nm. The dispersion had a pigment content of 15% by weight Encapsulated Particulate Solid Dispersions (9) and (10)

Boric acid (0.9 parts) followed by polyethylene glycol diglycidyl ether (the cross-linker, 0.35 parts) may be slowly added to each of Pigment Dispersions (9) and (10) (70 parts) at a temperature of about 25° C. The mixtures are then heated and stirred for 6 hours at a temperature of 50° C. to give Encapsulated Particulate Solid Dispersions (9) and (10) respectively.

Ink Jet Printing Inks (9) and (10)

Encapsulated Particulate Solid Dispersions (9) and (10) may be made up into Inks (9) and (10) as described in Table 8:

TABLE 8

| Ingredient | Ink (9) (parts) | Ink (10) (parts) |
|---|---|---|
| 2-Pyrrolidinone | 5 | 5 |
| Butyl Cellusolve ™ | 10 | 10 |
| Butyl Carbitol ™ | 16 | 16 |
| Surfactant | 1 | 1 |
| Encapsulated Particulate Solid Dispersion (9) | 20 | 0 |
| Encapsulated Particulate Solid Dispersion (10) | 0 | 20 |
| Water | 48 | 48 |
| Total | 100 | 100 |

EXAMPLE 18 AND COMPARATIVE EXAMPLE 1

No Borate Compound

Preparation of Dispersant (11)

A monomer feed composition was prepared by mixing methacrylic acid (236.5 parts), methyl methacrylate (413.5 parts), 2-ethylhexyl methacrylate (350 parts) and dipropylene glycol (318.2 parts). An initiator feed composition was prepared by mixing t-butyl-peroxy-2-ethylhexanoate (22 parts) and dipropylene glycol (220 parts). A chain transfer feed composition was prepared by mixing butyl-3-mercaptopropionate (8.01 parts) and dipropylene glycol (50 parts).

Dipropylene glycol (959.7 parts) was heated to 85° C. in a reactor vessel, continuously stirred and purged with a nitrogen gas atmosphere. The monomer feed, initiator feed and chain transfer feed compositions were slowly fed into the reactor vessel whilst stirring the contents, maintaining the temperature at 85° C. and maintaining the nitrogen atmosphere. The monomer feed composition was added to the reactor over 4 hours. The initiator feed and chain transfer feed compositions were both fed into the reactor over 5 hours. The reactor vessel contents were maintained at 85° C. for a further 1 hour before cooling to about 70° C.

Potassium hydroxide aqueous solution (45% w/w) (274 parts) was added to de-ionised water (329.9 parts). This was added to the reactor over a period of 20 minutes. The pH of the resulting mixture was measured and potassium hydroxide aqueous solution (45% w/w) was added as required to achieve a pH value of 9.

The resulting dispersant was then isolated from the reactor vessel. This was designated as Dispersant (11).

Dispersant (11) was an acrylic copolymer which had a number average molecular weight of 45000 an acid value of 154 mg KOH/g, a weight average molecular weight of 80000 and a polydispersity of 1.8 as measured by GPC.

Millbases (11) and (12)

Pigment Red 122 powder (3.3 parts, ex Dainichiseika), Dispersant (11) (2.86 parts) and deionised water (5.5 parts) were mixed using a Kenwood Chef Major Titanium mixer with "K-bar" head to give a viscous mixture. The mixture was then further homogenised using a Silverson L4R rotor-stator mixer, before being processed through a Netzsch Labstar Bead Mill to an average d(0.9) particle-size of 192 nm, as measured on Malvern Mastersizer M2000 particle size analyser.

The resultant mixture was recovered from the mill and diluted to a pigment concentration of 9.2% by the addition of deionised water. The dispersion was split evenly into two halves. One half was designated Millbase (11) and the other half was designated Millbase (12).

Crosslinking with and without a Borate Compound (A) Cross-Linking in the Presence of a Borate Compound To Millbase (11) (2000 parts) was added boric acid (2.4 parts, ex Sigma-Aldrich) in water (57.4 parts) and potassium hydroxide (1.8 parts, in 2.2. parts of water). The resultant mixture was heated to 70° C. in a 5 liter glass vessel within a thermostatically-controlled Grant W28 water-bath, and stirred using an IKA Labortechnik RW20 overhead stirrer with a PTFE coated 4-blade paddle. PEGDGE crosslinker (10.2 parts, polyethyleneglycol diglycidylether, ex Nagase ChemteX) in water (30.6 parts) was added and the mixture was stirred at 70° C. for 12 hours. After cooling, the pigment concentration was adjusted to 9.1% by addition of deionised water. The resultant product was referred to as Encapsulated Particulate Solid Dispersion (11).

(B) Cross-Linking in the Absence of a Borate Compound

The method of (A) above was repeated using Millbase (12) except that the boric add was omitted. The resultant product was referred to as the Comparative Encapsulated Particulate Solid Dispersion.

Inks were prepared as shown in Table 9:

TABLE 9

| Ingredient | Ink (11) (parts) | Comparative Ink (parts) |
|---|---|---|
| 1,2-Hexanediol | 4 | 4 |
| Glycerol | 15 | 15 |
| 2-Pyrrolidinone | 3 | 3 |
| Ethylene Glycol | 5 | 5 |
| Surfynol ™ 465 | 0.5 | 0.5 |
| Encapsulated Particulate Solid Dispersion (11) | 60.5 | |
| Comparative Encapsulated Particulate Solid Dispersion | | 60.5 |
| Water | 12 | 12 |
| Total | 100 | 100 |

(Surfynol ™ is a trademark of Air Products).

Print Testing of Ink (11) and Comparative Ink

Empty ink jet printer cartridges were filled with the inks described in Table 9 and fired from a EPSON D88 ink jet printer onto the substrates shown in Table 10. The optical density (ROD) of each print was measured using a Gretag Macbeth Spectrolino photodensitometer and the results are shown in Table 10. Higher ROD indicates a deeper, stronger colour.

TABLE 10

| Substrate | Ink 11 (ROD) | Comparative Ink (ROD) |
|---|---|---|
| SEC Crispia Photo | 1.94 | 1.77 |
| Sappi Aero Gloss | 1.72 | 1.55 |
| Xerox 4200 paper | 1.01 | 0.98 |
| Xerox 4024 paper | 0.99 | 0.95 |
| Office Planner paper | 1.08 | 1.03 |
| HP All in One Printing Paper | 1.18 | 1.11 |

Table 10 shows that Ink (11) derived from a process using a borate compound gave prints with a higher OD than the Comparative Ink made without using a borate compound.

The invention claimed is:

1. A process for preparing an encapsulated particulate solid dispersed in a liquid medium comprising cross-linking a dispersant with a cross-linking agent in the presence of a particulate solid and the liquid medium, thereby encapsulating the particulate solid within the cross-linked dispersant, wherein:
   a) the dispersant has at least one carboxylic acid group;
   b) the cross-linking agent has at least two epoxy groups; and
   c) the cross-linking is performed in the presence of a borate compound.

2. A process according to claim 1 wherein the borate compound is boric acid.

3. A process according to claim 1 or 2 wherein the dispersant has an acid value of at least 125 mg KOH/g.

4. A process according to claim 3 wherein the cross linking agent has one or more oligomeric dispersing groups.

5. A process according to claim 4 wherein the oligomeric dispersing groups are or comprise polyalkyeneoxide groups having from 3 to 200 alkyleneoxide repeat units.

6. A process according to claim 5 wherein the oligomeric dispersing groups are or comprise polyalkyeneoxide groups having from 5 to 20 alkyleneoxide repeat units.

7. A process according to claim 6 wherein the polyalkyleneoxide is or comprises polyethyleneoxide.

8. A process according to claim 1 wherein the cross-linking reaction between the carboxylic acid and epoxy groups is performed at a temperature of less than 100° C. and a pH of at least 6.

9. A process according to claim 1 wherein the cross-linking agent is soluble in the liquid medium.

10. A process according to claim 1 wherein the cross-linking agent has two epoxy groups.

11. A process according to claim 1 wherein the cross-linking reaction is performed at a temperature of from 30° C. to 70° C.

12. A process according to claim 1 wherein the cross-linking reaction is performed at a pH of from 7 to 12.

13. A process for preparing an encapsulated particulate solid dispersed in a liquid medium according to claim 1 wherein:
   a) the dispersant has at least one carboxylic acid group;
   b) the cross-linking agent has at least two epoxy groups and one or more ethylene glycol groups; and
   c) the cross-linking reaction between the carboxylic acid and epoxy groups is performed at a temperature of less than 100° C. and a pH of at least 6 in the presence of borate compound.

14. A process according to claim 1 wherein cross-linking is performed by a process comprising mixing a composition comprising the following components:
   a) 30 to 99.7 parts of the liquid medium;
   b) 0.1 to 50 parts of the particulate solid;
   c) 0.1 to 30 parts of the dispersant; and
   d) 0.001 to 30 parts of the cross-linking agent;
   e) 0.5 to 5 molar equivalents of borate compound(s) per mole of epoxy groups in the cross-linking agent;
   wherein the parts are by weight and the sum of the parts a)+b)+c)+d)+e)=100.

15. A process according to claim 1 comprising the further step of isolating the resultant encapsulated particulate solid from the liquid medium.

* * * * *